United States Patent
Chelaidite et al.

(10) Patent No.: US 10,295,004 B2
(45) Date of Patent: May 21, 2019

(54) HYDRAULICALLY-ADJUSTABLE ROTARY TO LINEAR STAGE MECHANISM

(71) Applicant: Akebono Brake Industry Co., Ltd., Chuo-ku, Tokyo (JP)

(72) Inventors: Galus Chelaidite, South Lyon, MI (US); Brian Lewis Boyle, Farmington Hills, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 5 days.

(21) Appl. No.: 15/434,407

(22) Filed: Feb. 16, 2017

(65) Prior Publication Data

US 2018/0231081 A1    Aug. 16, 2018

(51) Int. Cl.
| | | |
|---|---|---|
| F16D 65/18 | (2006.01) | |
| F16D 65/12 | (2006.01) | |
| F16D 65/54 | (2006.01) | |
| F16D 65/56 | (2006.01) | |
| F16D 55/225 | (2006.01) | |
| F16D 55/00 | (2006.01) | |
| F16D 121/04 | (2012.01) | |
| F16D 121/24 | (2012.01) | |
| F16D 125/40 | (2012.01) | |
| F16D 125/48 | (2012.01) | |

(52) U.S. Cl.
CPC .......... F16D 65/183 (2013.01); F16D 65/12 (2013.01); F16D 65/54 (2013.01); F16D 65/568 (2013.01); F16D 55/225 (2013.01); F16D 2055/0016 (2013.01); F16D 2121/04 (2013.01); F16D 2121/24 (2013.01); F16D 2125/40 (2013.01); F16D 2125/48 (2013.01)

(58) Field of Classification Search
CPC ........ F16D 55/227; F16D 65/18; F16D 65/22; F16D 65/183; F16H 25/2003
USPC .... 188/71.8, 71.9, 72.6–72.8, 156–164, 72.4
See application file for complete search history.

(56) References Cited

U.S. PATENT DOCUMENTS

| | | | |
|---|---|---|---|
| 6,053,289 A * | 4/2000 | Bauer | F16D 65/567 188/71.9 |
| 8,322,799 B2 | 12/2012 | Trimpe et al. | |
| 8,616,348 B2 | 12/2013 | Winkler et al. | |
| 2005/0252732 A1* | 11/2005 | Hashida | B60T 8/32 188/71.9 |
| 2007/0029142 A1 | 2/2007 | Drennen et al. | |
| 2010/0082213 A1 | 4/2010 | Taylor et al. | |
| 2013/0001027 A1* | 1/2013 | Baehrle-Miller | F16D 65/18 188/106 F |
| 2014/0158480 A1* | 6/2014 | Qian | F16D 55/226 188/72.6 |
| 2014/0216863 A1* | 8/2014 | Weber | F16D 65/183 188/71.9 |

(Continued)

FOREIGN PATENT DOCUMENTS

| | | |
|---|---|---|
| EP | 2270345 B1 | 1/2012 |
| WO | 00/08352 A1 | 2/2000 |

*Primary Examiner* — Christopher P Schwartz
(74) *Attorney, Agent, or Firm* — The Dobrusin Law Firm, P.C.

(57) ABSTRACT

A brake system that includes a brake piston that includes a piston pocket. A nut is located inside the piston pocket. During a brake apply, the brake piston is adapted to move a brake pad against a brake rotor to create a clamping force. During the brake apply, the nut is moved with the brake piston.

19 Claims, 4 Drawing Sheets

(56) References Cited

U.S. PATENT DOCUMENTS

| | | | | |
|---|---|---|---|---|
| 2015/0129371 A1* | 5/2015 | Gutelius | ................ | F16D 65/18 |
| | | | | 188/72.6 |
| 2015/0159714 A1* | 6/2015 | Malki | .................. | F16D 65/568 |
| | | | | 188/71.7 |
| 2015/0167761 A1* | 6/2015 | Son | ..................... | F16D 65/0006 |
| | | | | 188/72.6 |
| 2015/0300433 A1* | 10/2015 | Yasui | ...................... | F16D 65/18 |
| | | | | 188/162 |
| 2016/0032995 A1* | 2/2016 | Nishino | ............... | F16D 55/225 |
| | | | | 188/72.3 |
| 2016/0033019 A1* | 2/2016 | Aramoto | ................ | F16D 65/18 |
| | | | | 74/424.81 |
| 2016/0215840 A1* | 7/2016 | Chelaidite | ............ | F16D 55/227 |
| 2017/0191539 A1* | 7/2017 | Chelaidite | ............ | F16D 65/183 |
| 2017/0328432 A1* | 11/2017 | Chelaidite | ............ | F16D 65/183 |
| 2018/0148030 A1 | 5/2018 | Kim | | |

\* cited by examiner

US 10,295,004 B2

HYDRAULICALLY-ADJUSTABLE ROTARY TO LINEAR STAGE MECHANISM

FIELD

These teachings relate to an adjustable rotary to linear stage mechanism, and to a brake system having an adjustable rotary to linear stage mechanism.

BACKGROUND

A brake system can be used to slow or stop a moving vehicle. Brake systems typically include a brake caliper, inboard and outboard brake pads, and one or more brake pistons. During application of the brake system, the one or more brake pistons are moved, which causes the brake pads to move into contact with a brake rotor to create a clamping force to slow or stop the vehicle.

Some brake systems also include electromechanical parking brake systems to prevent movement of a stopped or parked vehicle. Some parking brake systems include one or more rotary to linear stage mechanisms that function to convert an input torque into a linear force to move the one or more brake pistons and brake pads into contact with the brake rotor to create the clamping force necessary to prevent movement of the vehicle.

Over time, brake pads tend to wear unevenly, producing a condition known as taper wear, where the leading end of the brake pad wears more than the trailing end of the brake pad. As a result, the leading end of the brake pad moves closer to the brake rotor compared to the trailing end of the brake pad. When taper wear occurs in brake systems having two or more brake pistons, the brake piston located at the leading end of the brake pad typically automatically adjusts its position relative to the brake pad during application of the service brake by moving out of the caliper bore and closer to the leading end of the brake pad that has moved closer to the brake rotor so that the brake system can remain responsive during successive applications of the service brake.

However, parking brake systems that are incorporated into brake systems having two or more brake pistons typically do not automatically adjust to compensate for brake pad wear during application of the service brake. Instead, some parking brake systems are adapted to make adjustments for pad wear or taper wear after the parking brake system has been applied. However, if a parking brake system is used infrequently, and/or if the brake pad has worn substantially since the last application of the parking brake, more time may be required to move the elements of the parking brake system to generate the clamping force necessary to maintain the vehicle in a stopped or parked position.

It may therefore be desirable to have a parking brake system that can automatically adjust during application of the service brake or during a brake apply to compensate for brake pad wear or taper wear so that when the parking brake is applied, a clamping force can be quickly and sufficiently.

SUMMARY

These teachings provide a parking brake system that is automatically adjusted during application of the service brake or during a brake apply to compensate for brake pad wear or taper wear so that when the parking brake is applied, a clamping force is quickly and sufficiently created at both brake pistons.

During application of the service brake, the position of one or more brake pistons relative to a brake pad is adjusted to compensate for brake pad wear. More specifically, as a brake pad wears over time and moves closer towards the brake rotor, each of the brake pistons adjust their position relative to the brake pad by moving out of the piston boot and/or caliper bore towards the brake pad. The teachings herein provide a hydraulically-adjustable rotary to linear stage mechanism that is automatically adjusted when the position of the brake piston is adjusted during normal application of the service brake. Therefore, upon activation of the parking brake system, the hydraulically-adjustable rotary to linear stage mechanism is in position to quickly provide a sufficient clamping force to prevent movement of a parked or stopped vehicle. Stated another way, the hydraulically-adjustable rotary to linear stage mechanism moves with the corresponding brake piston during application of the service brake. The hydraulically-adjustable rotary to linear stage mechanism moves with the corresponding brake piston when the brake piston adjusts its position relative to the brake pad by moving out of the piston boot and/or caliper bore towards the brake pad to compensate for wear. Thus, over time, the general or relative position of the nut relative to the piston pocket or bottom wall thereof remains generally the same or constant. This advantageously allows application of the parking brake to be quick and efficient. If the position of the nut or the hydraulically-adjustable rotary to linear stage mechanism did not move or adjust its position with the corresponding brake piston during application of the service brake, a gap between the nut and the bottom pocket wall may increase over time, which may therefore require more time to apply the parking brake and/or generate the clamping force necessary to maintain the vehicle in a stopped or parked position.

These teachings provide a brake system that includes a brake caliper; a brake piston supported in the brake caliper, the brake piston comprising a piston pocket; and a rotary to linear stage mechanism, the rotary to linear stage mechanism comprises a nut located in the piston pocket. During a brake apply, the brake piston is moved in an apply direction, and movement of the brake piston in the apply direction during the brake apply causes a brake pad to be moved against a brake rotor to create a clamping force. During the brake apply, the rotary to linear stage mechanism moves with the brake piston so that a position of the nut relative to the brake piston is adjusted.

These teachings provide brake system, comprising a first brake piston, a second brake piston, a first nut, and a second nut. The first brake piston comprising a first piston pocket. The second brake piston comprising a second piston pocket. The first nut is located inside the first brake piston, and the second nut located inside the second brake piston. During a brake apply, the first brake piston and the second brake piston are adapted to move a brake pad against a brake rotor to create a clamping force. During the brake apply the first nut is moved with the first brake piston and the second nut is moved with the second piston.

These teachings provide a brake system, comprising a brake caliper; a first brake piston supported in the brake caliper; a second brake piston supported in the brake caliper; and a parking brake system comprising a first rotary to linear stage mechanism and a second rotary to linear stage mechanism. The first brake piston comprises a first piston pocket. The second brake piston comprises a second piston pocket. The first rotary to linear stage mechanism includes a first nut, and the second rotary to linear stage mechanism includes a second nut. The first nut is received in the first piston pocket and the second nut is received in the second piston pocket. During a brake apply, the first brake piston and the second brake piston are adapted to be moved in an apply direction, and movement of the first brake piston and the second brake piston during the brake apply cause a brake pad to be moved against a brake rotor to create a clamping force. During the brake apply, the first nut moves along with the first brake piston in the apply direction, and the second nut moves along with the second brake piston in the apply direction.

Brake System.

The teachings herein provide a brake system. The brake system may be any system or assembly for creating a clamping force. The brake system may function to create a clamping force and/or brake apply to slow, stop, and/or maintain a vehicle in a stopped position.

The brake system may be any type of brake system. For example, the brake system may be an opposing brake system (i.e., a fixed caliper brake system) or a floating brake system (i.e., a floating caliper). The brake system may be a service brake system. The brake system may generally include one or more brake pads, and a brake caliper supporting one or more brake pistons. During a standard brake apply, the one or more brake pistons may be moved against the one or more brake pads by pressurizing brake fluid. The brake pads may be moved against the brake rotor to create clamping force. A parking brake system may be added to or integrated with the brake system. The parking brake system may be an ancillary system or assembly added to, or incorporated with, the brake system.

Clamping Force.

The clamping force may be a force that, when coupled with a brake pad coefficient of friction, functions to decelerate, slow, stop, and/or prevent movement or rotation of a brake rotor and/or a vehicle. The clamping force may be created during a standard brake apply or during application of the service brake (i.e., a brake apply force) to slow, stop, or prevent movement of a vehicle. The clamping force may be created during a parking brake apply (i.e., a parking brake force) to maintain a vehicle in a stopped or parked position.

Brake Rotor.

The brake rotor may cooperate with the components of the brake system, the parking brake system, or both to create the clamping force. The brake rotor may include an inboard side and an opposing outboard side. The brake caliper may be arranged so that one or more brake pads are located at the inboard side of the brake rotor (i.e., inboard brake pads), and one or more brake pads are located at the outboard side of the brake rotor (i.e., outboard brake pads), or both. When a vehicle is in motion, the brake rotor may rotate with a wheel and about an axle of a vehicle.

To create the clamping force during a standard brake apply, or during a parking brake apply, the friction material of one or more brake pads can be moved or pushed against at least one of the sides of the brake rotor. After the clamping force is created, the brake rotor may be restricted from moving and/or rotating, and, accordingly, the vehicle may be slowed, stopped, and/or restricted from moving. To release the clamping force, the friction material of the one or more brake pads can be moved away from the brake rotor. After the clamping force has been released, the brake rotor and, accordingly, the vehicle may move again.

Brake Pads.

One or more brake pads may be used to create the clamping force. The clamping force can be created by converting the kinetic energy of the vehicle into thermal energy by frictionally engaging one or more brake pads with one or more sides of the brake rotor. The one or more brake pads may include one or more features (i.e. ears, projections, etc.) that may engage or be engaged by a brake caliper, a support bracket, or both to maintain the location of the brake pads within the braking system and relative to the brake rotor.

The one or more brake pads may include a friction material and a pressure plate. The one or more brake pads may be supported on the brake caliper so that the friction material faces a side of the brake rotor. The pressure plate may oppose the friction surface. One or more brake pistons or one or more brake caliper fingers may be in selective contact with the pressure plate of a corresponding brake pad. For example, in some cases, one or more brake pistons may be in contact with the pressure plate of an inboard brake pad, and one or more brake caliper fingers may be in contact with the pressure plate of an outboard brake pad. In some cases, one or more brake pistons may be in contact with the pressure place of an inboard brake pad, and one or more brake pistons may be in contact with the pressure place of an outboard brake piston. During a brake apply, or while applying the parking brake, the one or more brake pistons and/or the one or more fingers can move all or an end of a corresponding brake pad so that the corresponding friction material engages a corresponding side of the brake rotor to create the clamping force.

The distance that the one or more of the brake pads are moved, or the distance that the ends of one or more brake pads must be moved relative to the brake rotor to create the clamping force may vary depending on taper wear. Taper wear may be defined as the tendency of the friction material of a brake pad to wear unevenly during use. Taper wear may result in the inboard, outboard or both pressure plates of the inboard, outboard or both brake pads no longer being parallel to the sides of a brake rotor. For example, during a brake apply, a parking brake apply, or both, a leading end of a brake pad may contact the brake rotor first and/or with greater force than the trailing end of the brake pad. This may cause the leading end to wear more, or wear faster, than the trailing end. Over time, the leading end of a brake pad will have moved a greater distance closer to the brake rotor than the trailing end to sufficiently engage the brake rotor and create the clamping force. To compensate for these differences and to ensure a sufficient clamping force can be created, a brake piston located at the leading end of the brake pad may be moved closer to the brake pad than a brake piston located at a trailing end of the brake pad. In other words, a leading brake piston may extend further out of a caliper bore and/or piston boot than a trailing brake piston.

Brake Caliper.

The brake caliper may function to support one or more the components of the brake system, one or more the components of the parking brake system, or both. For example, the brake caliper may include one or more supports configured to engage and/or support the one or more brake pads. The brake caliper may provide for one or more brake pads, or, preferably, two or more brake pads to move relative to the brake rotor. The brake caliper may move during a brake apply (i.e., a floating caliper), or the brake caliper may be fixed so that the brake caliper does not move during a brake apply (i.e., a fixed caliper). The brake caliper may be connected to any non-rotating or moving part of a vehicle, like a support or a knuckle.

The brake caliper may have one or more piston bores. Each piston bore may define a hollow region in the brake caliper configured to receive and support a corresponding brake piston. Some brake calipers have two or more piston bores. The piston bores can be located on only one side of the brake rotor, or on both sides of the brake rotor. Each piston bore includes a piston bore axis. The piston bore axis may extend generally perpendicular to a side of the brake rotor. The piston bore axis may be collinear with a spindle axis. A brake piston supported within a piston bore may be moved along the piston bore axis to create or release a clamping force during a standard brake apply, a parking brake apply, or both.

Brake Piston.

The one or more brake pistons may function to move a brake pad, or a corresponding end of brake pad, towards the brake rotor to create the clamping force. During a brake apply to decelerate or stop a vehicle, the brake pistons may be moved by pressurizing fluid, such as hydraulic brake fluid. To release the clamping force or the brake apply, the brake piston can be moved by depressurizing the fluid. The one or more brake pistons can also be moved without pressuring or depressurizing hydraulic fluid. For example, the brake pistons can be moved during a standard brake apply or during application of the service brake with an electric motor, for example. The brake system may include one brake piston, or the brake system may include two or more brake pistons.

During a parking brake apply, to create clamping force, the brake piston may be moved by actuating a corresponding rotary to linear stage mechanism in an apply direction. To release the clamping force or the parking brake, the brake piston can be moved by actuating the corresponding rotary to linear stage mechanism in an opposing release direction. During both a parking brake apply and a standard brake apply, the brake piston may be moved along a brake piston axis, which may be the same as, coplanar or coaxial with a spindle axis, a piston bore axis.

Piston Pocket.

The brake piston pocket may function to receive at least a portion of a corresponding rotary to linear stage mechanism. The brake piston pocket may be a cup or recess formed into one end of a brake piston. The brake piston pocket may include a bottom wall at the end or bottom of the brake piston pocket. A gap may exist between the rotary to linear stage mechanism and a corresponding bottom wall. During a parking brake apply, the gap may be taken up by moving the rotary to linear stage mechanism towards the bottom wall. The gap may be taken up once the nut contacts the bottom pocket wall. Once the gap is taken up, further movement of the rotary to linear stage mechanism may cause the rotary to linear stage mechanism or nut to press against the bottom wall and then move the brake piston and thus brake pad against the brake rotor to create the clamping force. The brake caliper may include any number of piston pockets (and thus brake pistons and rotary to linear stage mechanisms) on one or both sides of the brake rotor.

Parking Brake System.

A parking brake system may be added to or integrated with the brake system. The parking brake system may function to create a clamping force to maintain a vehicle in a stopped or parked position. The parking brake system may utilize one or more components of the brake system to create the clamping force, parking brake force, or both. For example, during a parking brake apply, the one or more brake pistons and the brake pads may be moved against the brake rotor to create the clamping force. The one or more brake pistons and the brake pads may be moved away from the brake rotor to release the clamping force. The parking brake system may comprise a motor gear unit (MGU), and one or more rotary to linear stage mechanisms, and one or more gears. The parking brake system may be activated or turned on by pressing a button, pulling a lever or cable, or automatically when a vehicle is put in park.

Motor Gear Unit (MGU).

The motor gear unit (MGU) may function to create or generate and then transfer torque suitable for creating and/or releasing a clamping force. During application of the parking brake, to create a clamping force, the MGU may function to generate torque sufficient to move the one or more rotary to linear stage mechanisms, the one or more brake pistons, the one or more brake pads, or a combination thereof toward the brake rotor thus creating drag which acts to prevent vehicle wheel rotation. During release of the parking brake to release the clamping force, the MGU may function to generate torque sufficient to move the one or more rotary to linear stage mechanisms, the one or more brake pistons, or both away from the one or more brake pads so that the brake pads move away from the brake rotor thus releasing the clamping force. The motor gear unit (MGU) may be any device or combination of devices that may function to perform one or more of the aforementioned functions. The MGU may be in communication with a controller, which may function to turn ON or turn OFF the MGU, the motor, or both.

At least a portion of the MGU may be contained within a housing. The housing may be integrally formed with the brake caliper; removably attached to the brake caliper; permanently attached to the brake caliper; or attached in any suitable way to any part of a vehicle, such as a support, support bracket, or knuckle. Preferably, the MGU is contained within a housing, which can be attached to a brake system with one or more suitable fasteners. The housing containing the MGU may be attached to the brake system after the brake system has been assembled. The housing containing the MGU may be attached to the brake system, separated from the brake system to service one or more components of the brake system, the parking, brake system, or both, and then reassembly the housing to the brake system. The motor gear unit (MGU) may include a motor and optionally one or more gears or gear trains.

Motor.

The motor may be any motor for creating a force or torque. For example, the motor may be a DC motor, a brushless motor, a series-wound motor, a shunt wound motor, a compound wound motor, a separately exited motor, a servomotor, a stepping motor, or a permanent magnet motor. The motor may include one or more electrical leads for connecting the motor to a power source and/or a controller.

Gear Train.

The motor gear unit (MGU) may include one or more gears or gear trains that may function to transfer, increase, and/or decrease a torque output of the motor. The gear train may include one or more gears. The gear train may be located between an output of the motor and an input of one of the gears.

Rotary to Linear Stage Mechanism.

The one or more rotary to linear stage mechanisms may function to transfer or convert a torque output from the MGU or gear train into a linear or axial force to move the one or more brake pistons during a parking brake apply. One or more of the rotary to linear stage mechanisms may be part of the parking brake system. One or more of the rotary to linear stage mechanisms may be part of the brake system or the service brake system. The rotary to linear stage mechanism may also be referred to herein as a hydraulically adjustable rotary to linear stage mechanism.

One of the rotary to linear stage mechanisms may be a high efficiency mechanism and one of the rotary to linear stage mechanisms may be a low efficiency mechanism. However, preferably, both of the rotary to linear stage mechanism are high efficiency mechanisms. One or both of the rotary to linear stage mechanism may be a hydraulically-adjustable rotary to linear stage mechanism according to the teachings herein.

Efficiency may refer to how well, or how efficiently, the mechanism converts or transfers torque or a rotational load input into a linear load or output force. The efficiency may depend on one or more factors, such as lead angle and coefficient of friction of the spindle and nut, for example.

The brake system or the parking brake system may include one rotary to linear stage mechanism, or two or more rotary to linear stage mechanism. Preferably, the system includes the same number of rotary to linear stage mechanisms as there are brake pistons.

The rotary to linear stage mechanism may include a spindle and a nut. The nut may be received in the piston pocket of the brake pistons, and may be trapped therein. Trapped may mean that a position of the nut relative to the brake piston remains substantially the same as the brake piston moves during a brake apply (i.e., application of the service brake) and during a parking brake apply. Trapped or trapping means that the nut and other components like a thrust bearing are restricted from being removed from the piston pocket without removing the clip or whatever other mechanism is used to capture the nut in the piston pocket. The nut can be trapped via any suitable method. This disclosure contemplates trapping the nut in the piston pocket between a bottom pocket wall and a clip that engages the wall of the piston pocket after the nut and a thrust bearing have been installed in the piston pocket. By trapping the nut within the piston pocket, the nut moves with the brake piston thereby constantly adjusting its position relative to the spindle when the brake piston moves. Other components, can be trapped with the nut in the piston pocket. For example, this disclosure contemplates also trapping a thrust bearing with the nut in the piston pocket.

Over time, as the brake pad wears, the brake piston gradually extends further out of the caliper bore and out of the piston boot closer to the brake pad and brake rotor. Because the nut moves with the brake piston, the nut unscrews from the spindle and moves with the brake piston in a direction closer to the brake pad and brake rotor. This allows the gap or spacing between the bottom pocket wall and the nut to remain substantially the same. This automatic or constant adjustment of the nut advantageously provides for the nut to be in position relative to the bottom pocket wall to quickly contact and push the brake piston against the brake pad to create the friction force when the parking brake system is activated.

If the nut were not automatically or constantly adjusted (i.e., if the nut did not follow the brake piston as the brake piston moved closer to the brake pad as the pad wears), the gap or spacing between the bottom pocket wall would constantly increase as the brake piston moved further out of the caliper bore and piston boot and closer to the brake pad as the pad wears. Then during application of the parking brake, additional time may be required to apply the parking brake because the increased gap between the nut and the bottom pocket wall must first be taken up before the nut can move or push the brake piston. In other words, additional time would be required to unscrew the nut from the spindle before the nut would be in position to contact the bottom pocket wall and then move the brake piston against the brake pad to create the clamping force.

Moreover, because one end of a brake pad wears more than another end of a brake pad (due to taper wear or reverse taper wear), one piston may extend further out of the brake caliper or caliper bore than another brake piston. Therefore, the gap between one nut and the corresponding bottom pocket wall may be different (larger or smaller) than the gap between another nut and corresponding bottom pocket wall. If for example, the parking brake system is activated in such a condition, one of the nuts would contact the corresponding bottom pocket wall first (i.e., the one with the smaller gap between the nut and bottom wall) and begin generating the clamping force before the other nut contacts its corresponding bottom pocket wall.

The rotary to linear stage mechanism may be may be non-locking. In other words, because the coefficient of friction between the spindle and nut in the high efficiency mechanism is generally low due to rolling friction, back driving may occur when a reaction force applied to the spindle, the nut, or both, is greater than the static force or coefficient of friction in the high efficiency mechanism. This may undesirably cause the spindle, nut, or both to rotate or move in an opposing direction after a clamping force has been created, which may release the clamping load. Therefore, a mechanical brake or lock may be required to prevent this back driving and thus sustain the linear output force and/or maintain the clamping force of the parking brake system. Without such a mechanical brake or lock, the high efficiency mechanism may undesirably, and prematurely, release the clamping force after it is created and the MGU is turned OFF.

One or more of the rotary to linear stage mechanism may be any high efficiency mechanism or mechanism. For example, the high efficiency mechanism may a ball screw assembly, a roller screw or planetary screw assembly, or a combination thereof. Exemplary ball screws may utilize ball bearings as load transfer elements between the nut and spindle or screw. During movement of the ball screw, the ball bearings may circulate along races or grooves between the spindle and the nut. A roller screw or planetary screw may be similar to a ball screw except that roller screws use rollers or planets as the load transfer elements that rotate around the screw. The load on a ball screw, the roller screw, or both is distributed over a large number of ball bearings or rollers, via roller threads, respectively, so that each ball bearing or roller, when subjected to force, may roll, and therefore, friction is reduced, which may equate to high efficiency. Accordingly, less force or torque may be required to move a spindle and nut in a ball screw or roller screw in an apply direction, a release direction, or both.

One or more of the rotary to linear stage mechanisms may be a low efficiency mechanism or system. The one or more low efficiency devices may function as the mechanical brake or lock to prevent the one or more high efficiency devices from back driving. The one or more low efficiency devices may be self-locking, and may therefore sustain the clamping force of the parking brake assembly once created. Self-locking may mean the assembly will not back drive unless a sufficient opposing rotational load or torque is applied to the low efficiency spindle, nut or both, that overcomes the friction load at the threads of the low efficiency device. Accordingly, at least one low efficiency device may be used to prevent back driving of one or more of the high efficiency devices. The one or more low efficiency devices may be one or more lead screws. Lead screws may include mating helical threads between the spindle or screw and nut. In a lead screw, the friction between the spindle and nut trust be first overcome before the lead screw can rotate. Accordingly, more torque may be required to rotate a lead screw than the ball screw.

Gears.

The parking brake system may include one or more gears. One gear corresponds to the leading brake piston (i.e., leading gear) and one gear corresponds to the trailing brake piston (i.e., trailing gear). One or both of the gears may receive an input torque from the MGU. That is, the leading gear may receive direct torque input from the MGU, or the trailing gear may receive direct torque input from the MGU. The gear that does not receive direct torque input from the MGU may receive torque from the gear that does receive direct torque input from the MGU by way of a belt or chain that connects the two gears.

Rotation of the gears in an apply direction during a parking brake apply, causes the corresponding spindles to rotate in an apply direction, which causes the corresponding nuts to move axially along an axis of the corresponding spindles in an apply direction, which, after the nuts contact the corresponding bottom pocket walls of the corresponding brake piston, cause the brake pistons to move in an apply direction, which cause the brake pads to move in an apply direction against the brake rotor to create the clamping force. Rotation of the gears in a release direction, causes the corresponding spindles to rotate in a release direction, which causes the corresponding nuts to move axially along an axis of the corresponding spindles in a release direction. The apply direction may be clockwise, and the release direction may be counterclockwise, or vice versa.

Piston Seal.

The brake caliper may include one or more piston seals. The piston seal may function to prevent fluid from leaking out of or from the one or more caliper bores. The piston seal may prevent dust and other debris from entering the one or more caliper bores and/or contaminating the fluid contained therein. The piston seal may prevent a corresponding brake piston from rotating. By preventing the brake piston from rotating within the piston boot, damage to the piston boot can be prevented. The piston seal may be attached to the brake caliper in the area of the caliper bores; to an outer surface of a corresponding brake piston; or both. The piston seal may support a corresponding brake piston. piston seal may be fabricated from any suitable material. Preferably, the piston seal is fabricated from a flexible material so that the piston seal can move, flex, bend, and/or deform, without tearing or otherwise becoming damaged, when a corresponding brake piston is moved.

DETAILED DESCRIPTION

Figure 1:
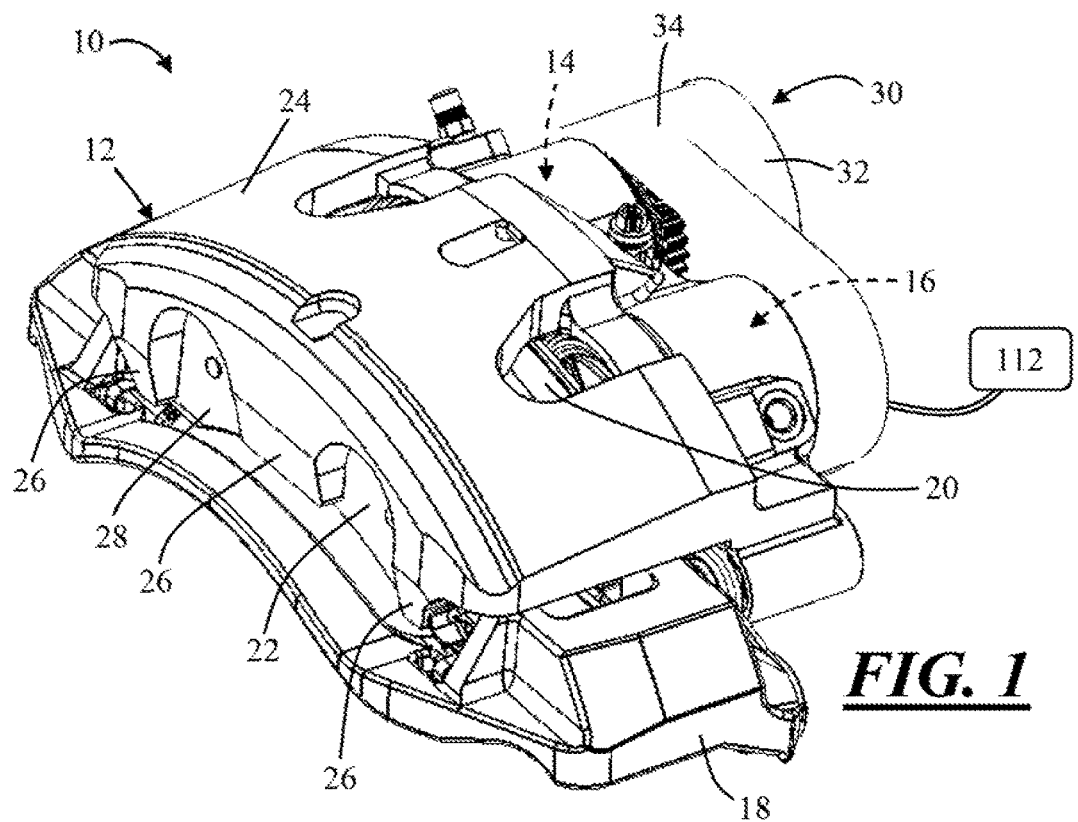
FIG. 1 is a perspective view of a brake system.

FIG. 1 is a perspective view of the brake system 10. The brake system 10 includes a brake caliper 12 that, supports a leading brake piston assembly 14 and a trailing brake piston assembly 16. The brake system 10 includes a support bracket 18 that supports an inboard brake pad 20 and an outboard brake pad 22. The brake caliper 12 includes a bridge 24 with fingers 26. The fingers 26 are in contact with a pressure plate 28 of the outboard brake pad 22. The brake system 10 also includes a parking brake system 30. The parking brake system 30 includes a motor gear unit (MGU) 32 located within a cover 34. The MGU 32 generally includes a motor and a gear train that functions to increase a torque output of the motor.

Figure 2:
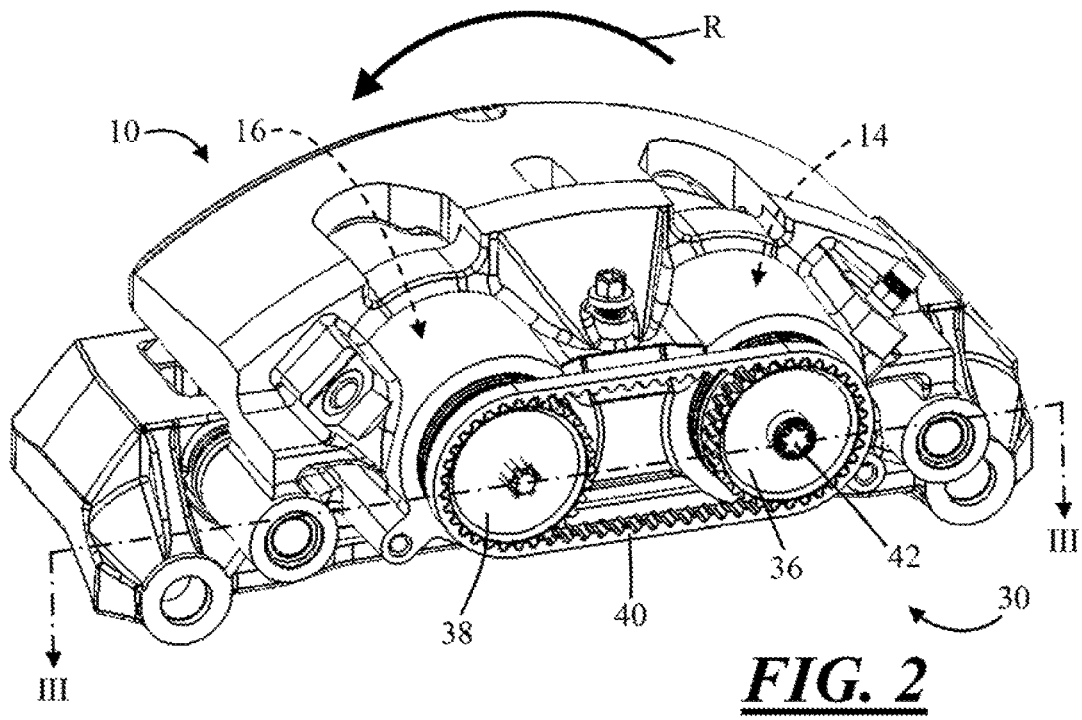
FIG. 2 is another perspective view of the brake system of FIG. 1, with the cover removed.

FIG. 2 is a perspective view of the brake system 10, with the cover 34 and the MGU 32 removed for clarity. Relative to a rotational direction R of a brake rotor, the parking brake system 30 includes a leading gear 36 in communication with the leading brake piston assembly 14, and a trailing gear 38 in communication with the trailing brake piston assembly 16. The gears 36, 38 are connected together with a belt 40. The leading gear 36 includes an input area 42 by which torque from the 32 is transmitted to the leading gear 36. By way of the belt 40, rotation of the leading gear 36 via the MGU 32 causes the trailing gear 38 to also rotate.

Figure 3:
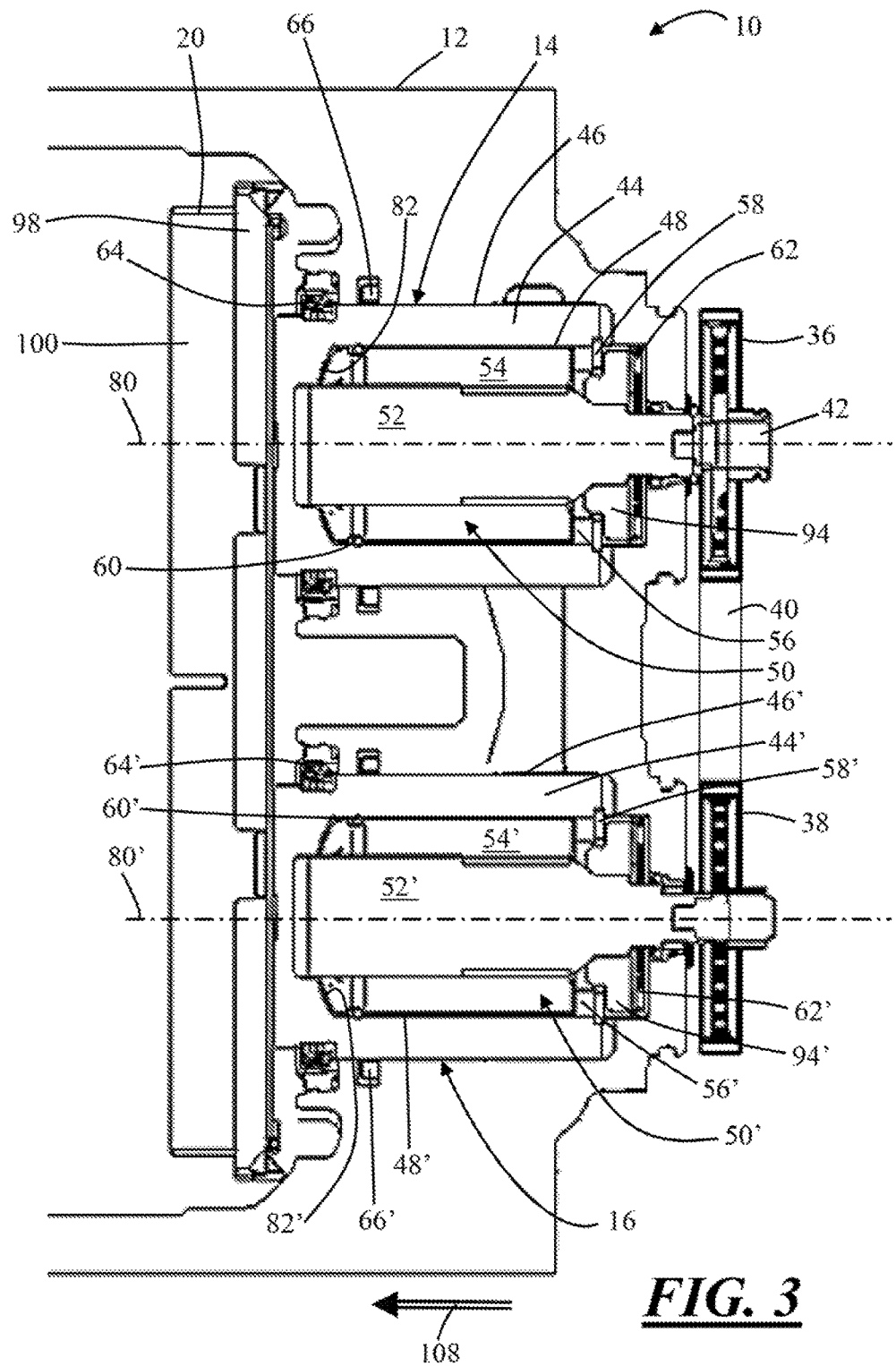
FIG. 3 is a partial, cross-sectional view of the brake system taken along line III-III of FIG. 2.

FIG. 3 is a partial cross-sectional view of the brake system 10 taken along line III-III of FIG. 2. The leading brake piston assembly 14 includes a leading brake piston 44 that is supported in a caliper bore 46 defined in the brake caliper 12. The leading brake piston 44 includes a cup-shaped piston pocket 48. Received in the piston pocket 48 is a hydraulically-adjustable rotary to linear stage mechanism 50. The hydraulically-adjustable rotary to linear stage mechanism 50 is a high efficiency mechanism that includes a spindle 52 and a nut 54. The spindle 52 is in rotational communication with the leading gear 36 so that when torque is applied to the input portion 42 of the leading gear 36 by the MGU 32 (FIG. 1), the spindle 52 rotates. As will be described further below, when the spindle 52 is rotated, the nut 54 moves axially along a longitudinal axis 80 of the spindle 52 either towards or away from a bottom pocket wall 82 of the piston pocket 48. The direction that the nut 54 is moved depends on the direction that the leading gear 36 is rotated by the MGU 32. That is, during a parking brake apply, the spindle 52 is rotated in an apply direction so that the nut 54 is moved along axis 80 in direction 108. When the parking brake is released, the spindle 52 is rotated in an opposing release direction so that the nut 54 is moved in an opposite direction of direction 108.

Figure 4:
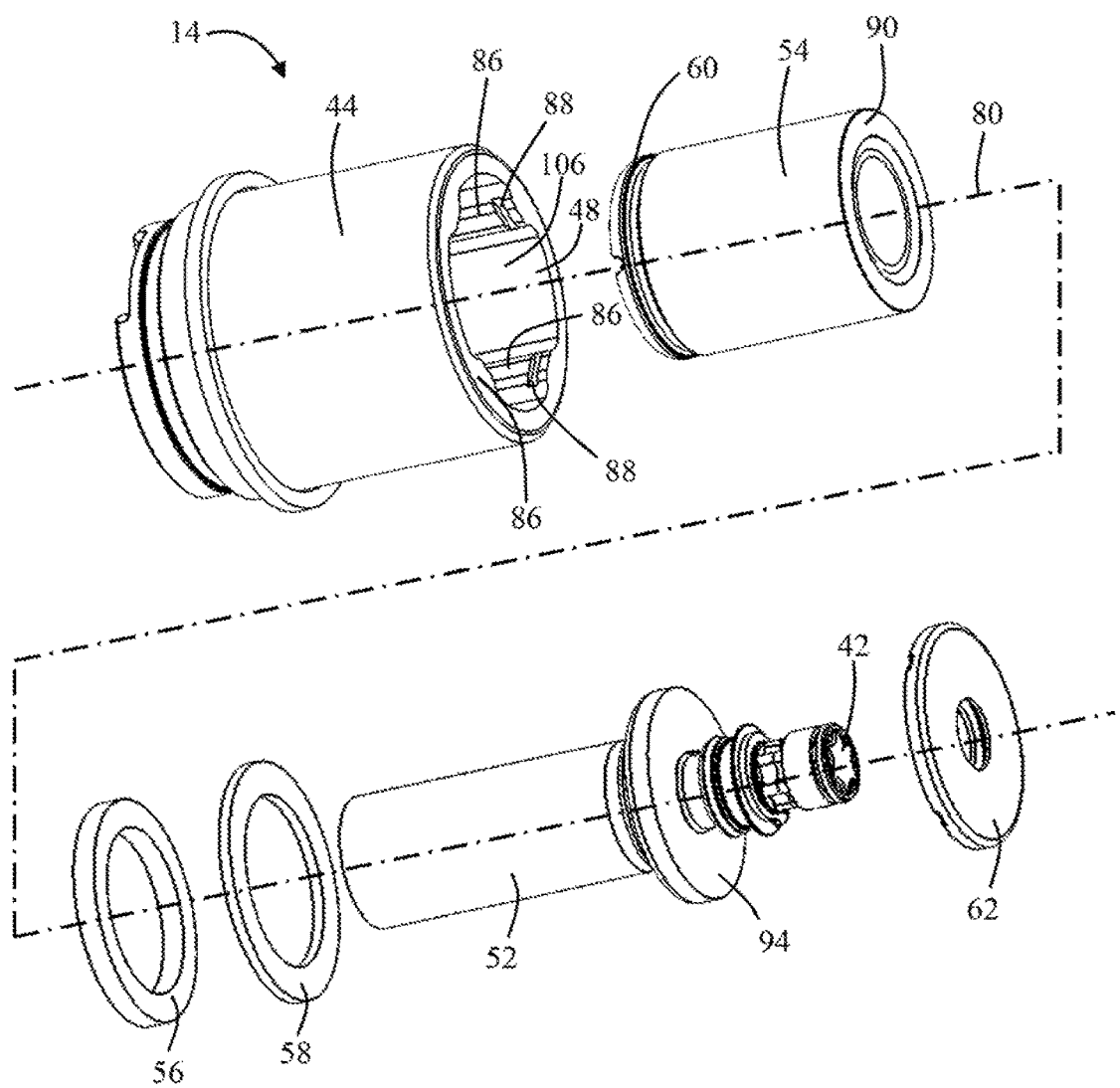
FIG. 4 is an exploded, perspective view of a brake piston assembly that includes the hydraulically-adjustable rotary to linear stage mechanism.

The leading brake piston assembly 14 includes a thrust bearing 56 located adjacent the nut 54, and a clip 58 that is attached to the inner wall 106 of the piston pocket 48 (See FIG. 4). The clip 58 functions to trap and maintain both of the nut 54 and the thrust bearing 56 inside the piston pocket 48 so that during a standard brake apply or application of the service brake, the nut 54 and the thrust bearing 56 are pushed or moved with the brake piston 44 in direction 108. An O-ring 60 surrounds the nut 54 and is in contact with the inner wall 106 of the piston pocket 48 so that the nut 54 is restricted from rotating about axis 80 during a parking brake apply. Another thrust bearing 62 is sandwiched between a flange 94 of the spindle 52 and the brake caliper 12.

A piston boot 64 is attached to the brake caliper 12 and surrounds the outside surface of the leading brake piston 44. The piston boot 64 prevents dust and debris from entering between the outside surface of the brake piston 44 and the bore 46. A piston seal 66 is received in a groove defined in the brake caliper 12 and surrounds the outside surface of the leading brake piston 44 so that the brake piston 44 is restricted from rotating about axis 80; dust and other debris are restricted from entering the caliper bore 46; and/or hydraulic fluid is prevented from leaking.

The trailing brake piston assembly 16 includes generally the same components as the leading brake piston assembly 14. The leading brake piston assembly 16 includes a leading brake piston 44' that is supported in a caliper bore 46' defined in the brake caliper 12. The leading brake piston 44' includes a cup-shaped piston pocket 48'. Received in the piston pocket 48' is a hydraulically-adjustable rotary to linear stage mechanism 50' that is part of the parking brake system 30. The hydraulically-adjustable rotary to linear stage mechanism 50' is a high efficiency mechanism that includes a spindle 52' and a nut 54'. The spindle 52' is in rotational communication with the trailing gear 38 so that when torque is applied to the input portion 42 of the leading gear 36 by the MGU 32 (FIG. 1) and the trailing gear 38 is rotated by way of the belt 40, the spindle 52' is rotated. When the spindle 52' is rotated, the nut 54' moves axially along a longitudinal axis 80' of the spindle 52' either towards or away from a bottom pocket wall 82' of the piston pocket 48'. The direction that the nut 54' is moved depends on the direction that the leading gear 36 is rotated by the MGU 32. That is, during a parking brake apply, the spindle 52' is rotated in an apply direction so that the nut 54' is moved along axis 80' in direction 108'. When the parking, brake is released, the spindle 52' is rotated in an opposing release direction so that the nut 54' is moved in an opposite direction of direction 108.

Like the leading brake piston assembly 14, the trailing brake piston assembly 16 includes a thrust bearing 56' located adjacent the nut 54', and a clip 58' that is attached to the inner wall of the piston pocket 48'. The clip 58' functions to trap and maintain the nut 54' and the thrust bearing 56' inside the piston pocket 48' so that during a standard brake apply or application of the service brake, the nut 54' and the thrust bearing 56' are pushed or moved with the brake piston 44' in direction 108. An O-ring 60' surrounds the nut 54' and is in contact with the inner wall of the piston pocket 48' to restrict the nut 54' from rotating about axis 80' during a parking brake apply. Another thrust bearing 62' is sandwiched between a flange 94' of the spindle 52' and the brake caliper 12.

A piston boot 64' is attached to the brake caliper 12 and surrounds the outside surface of the leading brake piston 44'. The piston boot 64' prevents dust and debris from entering between the outside surface of the brake piston 44' and the bore 46'. A piston seal 66' is received in a groove defined in the brake caliper 12 and surrounds the outside surface of the leading brake piston 44' so that the brake piston 44' is restricted from rotating about axis 80'; dust and other debris are restricted from entering the caliper bore 46'; and/or hydraulic fluid is prevented from leaking.

FIG. 4 illustrates an exploded, perspective view of the leading brake piston assembly 14. Because the trailing brake piston assembly 16 includes generally the same components as the leading brake piston assembly 14, it is understood that FIG. 4 also illustrates may if not all of the features of the trailing brake piston assembly 16. The leading brake piston assembly 14 includes the leading brake piston 44, which includes a piston pocket 48. One or more projections 86 project inwardly from the wall 106 of the piston pocket 48 towards the center axis 80 so that when the nut 54 is installed in the piston pocket 48, fluid bubbles can be evacuated during hydraulic fluid bleeding. It is also contemplated, however, that instead of the projections 86 extending from the wall 106 of the piston pocket 48, the wall 106 may be substantially smooth, and, the O-ring 60 surrounding the nut 54 may include one or more projections that contact the wall 106 when the nut 54 is installed in the brake piston 44. This alternative configuration may also allow for fluid bubbles to be evacuated during hydraulic fluid bleeding. It is understood, however, that in some configurations, projections 86 on the wall 106 and projections on the O-ring 60 may be used. Some configurations of O-ring seals and their engagement with the wall of the piston pocket are found in Applicant's currently pending U.S. patent application Ser. No. 15/275,791 filed on Sep. 26, 2016, which is hereby incorporated by reference herein for all purposes.

The piston pocket 48 and/or projections 86 include grooves 88 for receiving the clip 58 after the nut 54 and the thrust bearing 56 have been installed in the piston pocket 48. After the clip 58 has been installed in the grooves 88, the nut 54 and the thrust bearing 56 are trapped or maintained inside the piston pocket 48 in an assembled state (i.e., FIG. 3), the thrust bearing 56 is sandwiched between the clip 58 and a face 90 of the nut 54. The other thrust bearing 62 is sandwiched between the flange 94 of the spindle 52 and the brake caliper 12.

The nut 54 is received in the piston pocket 48. An O-ring 60 surrounding the nut 54 is in contact with and frictionally engages the projections 86 and/or wall 106 of the piston pocket 48 so that fluid bubbles can be evacuated during hydraulic fluid bleeding. The O-ring 60 also restricts or prevents rotation of the nut 54 during a parking brake apply, but allows for the nut 54 to rotate during application of the service brake or during a brake apply as will be discussed further below.

Operation of the service brake or the brake system 10 will now be described with reference to the figures, including FIGS. 5A and 5B. It is understood that these method steps can be performed in virtually any order, and one or more of the steps described herein may be combined, omitted, or repeated.

Figure 5A:
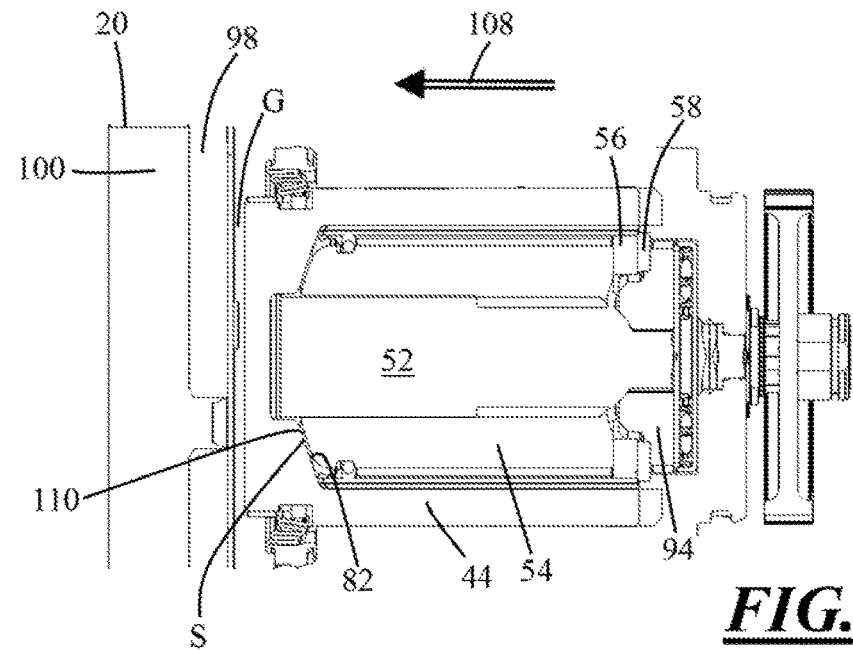
FIG. 5A is a cross-sectional view of a brake piston and the hydraulically-adjustable rotary to linear stage mechanism relative to the outboard brake pad.
Figure 5B:
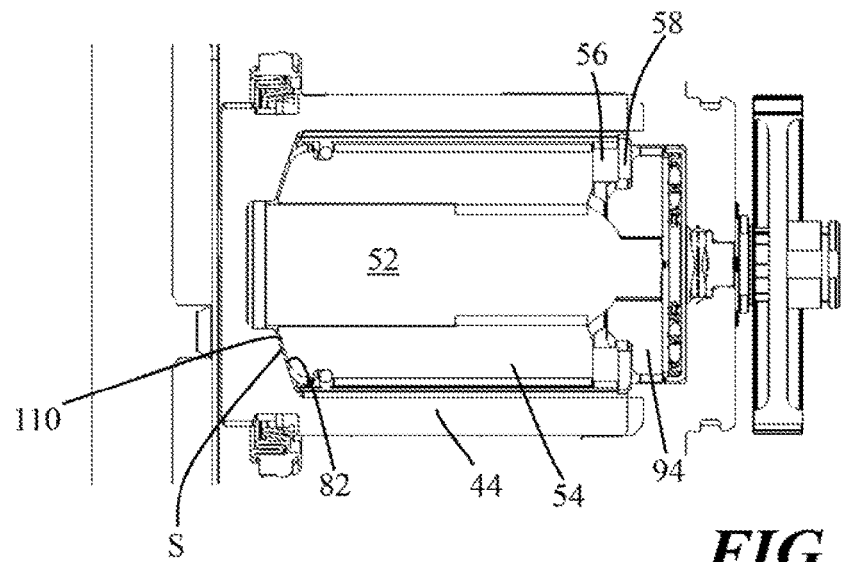
FIG. 5B is a cross-sectional view of a brake piston and the hydraulically-adjustable rotary to linear stage mechanism relative to the inboard brake pad.

While FIGS. 5A and 5B show the inboard brake piston 44 and the components of the hydraulically-adjustable rotary to linear stage mechanism 50, these figures may also represent the outboard brake piston 44' and the corresponding components of the hydraulically-adjustable rotary to linear stage mechanism 50.

It is also understood that while the following description refers to both of the inboard and outboard brake pistons 44, 44' and both of the corresponding hydraulically-adjustable rotary to linear stage mechanisms 50, 50', the operation of the service brake or brake system 10 may occur with only one of the brake pistons 44, 44' and only one of the corresponding hydraulically-adjustable rotary to linear stage mechanisms 50, 50'.

First, during application of the service brake or during a standard brake apply to slow or stop a moving vehicle, when a driver depresses the brake pedal, hydraulic fluid is pressurized, which causes the brake pistons 44, 44' to move in the direction 108 towards the pressure plate 98 of the inboard brake pad 20 and take up any gap G defined between the brake piston 11, 44' and the pressure plate 98 (See Gap G at FIG. 5A).

Once in contact with the pressure plate 98, the pressurized hydraulic fluid causes the brake pistons 44, 44' to move the brake pad 20 in direction 108 towards the brake rotor so that the friction material 100 of the brake pad 20 contacts a face of the brake rotor to create the clamping force to slow or stop the vehicle.

As was discussed above at FIGS. 3 and 4, each of the brake pistons 44, 44' include a groove 88, 88' that retains the respective clip 58, 58', which functions to trap or retain the nut 54, 54' and the thrust bearing 56, 56' inside the respective piston pocket 48, 48'. Therefore, during application the service brake or during a brake apply, as the respective brake piston 44, 44' is moved out of the piston boot 64, 64' in direction 108 to create the clamping force, the clips 58, 58' move with the corresponding brake piston 44, 44' and contact the corresponding thrust bearing 56, 56' which therefore pushes the corresponding nut 54, 54' in direction 108 so that the respective nut 54, 54' remains in close proximity to the corresponding bottom pocket wall 82, 82' and the spacing S between the bottom pocket wall 82, 82' of the piston pocket 48, 48' and the corresponding facing surface 110 the remains generally the same during movement of the brake piston 44, 44'. The spacing S may be on the order of about 1 mm, for example. During this movement, torque is developed between the nut 54, 54' and the corresponding piston 44, 44', which causes the nut 54, 54' to rotate about the axis 108, 108', while the spindle 52, 52' is restricted from rotating by way of a brake in the MGU 32, for example. Accordingly, the nut 54, 54' unscrews and moves in direction 108 away from the flange 94, 94' of the spindle 52, 52', thus following the brake piston 44, 44'.

After release of the service brake or release of the brake apply, or after the hydraulic fluid is at least partially depressurized, the brake piston 44, 44' may move partially back into the piston boot 64, 64' and caliper bore 46, 46' (i.e., in a direction opposite 108). However, the brake piston 44, 44' does fully retract in direction 108 or return to its pre-brake apply position in the piston boot 64, 64' and caliper bore 46, 46'. Instead, the brake piston 44, 44' remains at least some distance closer to the brake pad 20 than before the brake apply. Of course, the nut 54, 54', which is trapped in the piston pocket 48, 48' by way of the clip 58, 58', also does not return to its pre-brake apply position on the spindle 52, 52', but instead remains in close proximity to the bottom pocket wall 82, 82'. Accordingly, the hydraulically-adjustable rotary to linear stage mechanism 50, 50' automatically adjusts the position of the nut 54, 54' relative to the brake piston 44, 44' during every application of the service brake or during a standard brake apply so that when the parking brake system is applied (discussed below), a sufficient clamping force can be quickly created.

The distance that each nut 54, 54' is adjusted may be primarily based on the distance that the corresponding brake piston 44, 44' moves when the service brake is applied and after the brake apply, which may be primary based on how much of the friction material 100 located at the corresponding end of the brake pad 20 is worn. In other words, the amount that each nut 54, 54' moves during the adjustment may be the same if the wear of the friction material 100 is generally the same between the leading end and the trailing end of the brake pad 20 (i.e., little to no taper wear). Alternatively, when there is a lot of taper wear between the leading and trailing end of the brake pad 20, the amount that each nut 54, 54' moves during the adjustment may be the different or vary.

Operation of the parking brake system 30 will now be described. It is understood that these method steps can be performed in virtually any order, and one or more of the steps described herein may be combined, omitted or repeated.

A signal may be transmitted by the controller 112 to the MGU 32 to apply the parking brake. By way of the motor and gear train in the MGU 32, torque is supplied to the input portion 42 of the leading gear 36, which causes the leading gear 36 to rotate in an apply direction. The spindle 52 is fixed to the leading gear 36 so that rotation of the leading gear 36 in the apply direction causes the spindle 52 to also rotate in the apply direction. Rotation of the spindle 52 in the apply direction causes the nut 54 to move axially along axis 80 in the apply direction 108 until the facing surface 110 of the nut 54 contacts the bottom pocket wall 82 of the brake piston 44. Continued rotation of the gear 36 and thus movement of the nut 54 causes the nut 54 to move the brake piston 44 and the brake pad 20 against the brake rotor to generate the clamping force necessary to prevent movement of the vehicle.

By way of belt 40, rotation of gear 36 causes gear 38 to also rotate. The spindle 52' is fixed to the trailing gear 38 so that rotation of the trailing gear 38 in the apply direction causes the spindle 52' to also rotate in the apply direction. Rotation of the spindle 52' in the apply direction causes the nut 54' to move axially along axis 80' in the apply direction 108 until the nut 54' contacts the bottom pocket wall 82' of the brake piston 44'. Continued rotation of the gear 38 and thus movement of the nut 54' causes the nut 54' to move the brake piston 44' and the brake pad 20 against the brake rotor to generate the clamping force necessary to prevent movement of the vehicle.

While the following description relates to the leading brake piston assembly 14, because the trailing brake piston assembly 16 includes similar components as the leading brake piston assembly 14, the following description may likewise be applicable to the trailing brake piston assembly 16.

Without adjusting the nut 54 during application of the service brake (i.e., without the clip 58 trapping or retaining the nut 54 and the thrust bearing 56 in the brake piston 44), when the brake piston 44 is moved during the brake apply, the nut 54 would not move with or follow the brake piston 44. Instead, the spacing S between the bottom pocket wall 82, of the piston pocket 48, and the corresponding facing surface 110 of the nut 54 would increase as the brake piston 44 is moved from its position in FIG. 5A relative to the brake pad 20 to its position in FIG. 5B relative to the brake pad 20. Accordingly, in such a configuration, when the parking brake system 30 is activated, more time would be required to move the nut 54 in direction 108 to cover the increased spacing before the facing surface 110 of the nut 54 contacts the bottom pocket wall 82 and begins to move the brake piston 44 in direction 108 to create the clamping force. This spacing S may increase over time as the brake pad continues to wear and the brake piston 44 moves and adjusts its position relative to the brake pad without the nut 54 moving with the brake piston 44.

Because the gap between the other nut 54' and its corresponding bottom pocket wall 82' is smaller (because that end of die brake pad 20 wears less so that the brake piston 44' does not move or adjust out of the caliper bore 46' as far) the nut 54' at the other brake piston assembly 16 may contact the corresponding bottom pocket wall 82' first and begin generating clamping force while the nut 54 is still being moved to cover the gap between the nut 54 and its bottom pocket wall 82. This may lead to an undesirable condition where uneven clamping force is developed between the two ends of the brake pad 20 or more time being required to develop the clamping force.

To release the parking brake, the MGU 32 rotates the gears 36, 38 in an opposing direction or release direction, which causes the corresponding spindles 52, 52' to rotate in an opposing or release direction, which causes the corresponding nuts 54, 54' to move axially in a release direction (in a direction opposite 108) and out of contact with the corresponding bottom pocket walls 82, 82'. The brake pistons 41, 44' are then free to relax and move away from the inboard brake pad 20 so that the inboard brake pad 20 can move away from the brake rotor to release the clamping force.

The invention claimed is:

1. A brake system comprising:
   a brake piston comprising a piston pocket having a wall;
   a rotary to linear stage mechanism, the rotary to linear stage mechanism comprises a nut located within the piston pocket, the nut comprises an O-ring;
   wherein during a brake apply, the nut is configured to rotate within the piston pocket, and during the brake apply the brake piston is configured to axially move the nut, and
   wherein the O-ring is configured to engage the wall of the piston pocket so that the nut is restricted from rotating when the nut is axially moved during another brake apply.

2. The brake system of claim 1, wherein the rotary to linear stage mechanism comprises a spindle;
   wherein during the another brake apply, the spindle is rotated with an MGU, which causes the nut to move, and
   wherein during the another brake apply, the nut is configured to move the brake piston.

3. The brake system of claim 2, wherein the brake system comprises:
   a second brake piston;
   a second rotary to linear stage mechanism that includes a second nut and a second spindle;
   a first gear in communication with the spindle; and
   a second gear in communication with the second spindle,
   wherein during the another brake apply, torque provided by the MGU is applied to the first gear, which causes the spindle to rotate in an apply direction, which causes the nut to move in an apply direction and move the brake piston and a brake pad against a brake rotor, and
   wherein the second gear is connected to the first gear so that rotation of the first gear in the apply direction causes the second gear to rotate in the apply direction, which causes the second spindle to rotate in the apply direction, which causes the second nut to move in the apply direction and move the second brake piston and the brake pad against the brake rotor.

4. The brake system of claim 3, wherein the brake system comprises a second clip that engages a groove defined in a wall of a piston pocket of the second brake piston,
   wherein the second clip traps the second nut inside of the piston pocket of the second brake piston so that during the brake apply, the second brake piston is configured to move the second nut, and
   wherein during the brake apply, the first piston and/or second piston are moved by pressurizing hydraulic fluid.

5. The brake system of claim 2, wherein the piston pocket comprises at least one rib, the O-ring is configured to frictionally engage the wall of the piston pocket and/or the at least one rib so that the nut is restricted from rotating when the nut is moved during the another brake apply.

6. The brake system according to claim 1, wherein the brake system comprises a thrust bearing located inside of the piston pocket.

7. The brake system of claim 6, wherein the thrust bearing is located in between the nut and a clip.

8. The brake system of claim 1, wherein the brake system comprises a clip located inside of the piston pocket, and
   wherein the clip traps the nut inside the piston pocket so that during the brake apply, the nut is moved by the brake piston when the brake piston is moved.

9. The brake system of claim 1, wherein during the brake apply, the brake piston is moved by pressuring hydraulic fluid.

10. A brake system, comprising:
    a first brake piston comprising a first piston pocket;
    a first nut located inside of the first piston pocket;
    an O-ring surrounding the first nut; and
    a first clip located inside of the first piston pocket;
    wherein during a brake apply, the first brake piston is configured to move, and movement of the first brake piston causes the first nut to move, and
    wherein the O-ring is configured to frictionally engage a wall of the first piston pocket so that the first nut is restricted from rotating during another brake apply.

11. The brake system of claim 10,
    wherein during the brake apply, the first nut is configured to rotate within the first piston pocket while being axially moved by the first brake piston, and
    wherein the brake piston is moved by pressuring hydraulic fluid during the brake apply.

12. The brake system of claim 11, wherein the brake system comprises a first spindle;
    wherein during the another brake apply, the first spindle is rotated, which causes the first nut to move axially against a bottom pocket wall of the first piston pocket to move the first brake piston and a brake pad against a brake rotor; and
    wherein during the another brake apply the first nut is restricted from rotating.

13. The brake system of claim 10, wherein the wall comprises one or more projections that extend from the wall towards a center of the piston pocket, and
    wherein the O-ring surrounding the first nut frictionally engages the one or more projections to prevent the nut from rotating during the another brake apply.

14. The brake system of claim 10, wherein the brake system comprises a second brake piston having a second piston pocket, a second nut located inside of the second piston pocket, a second clip located inside of the second piston pocket, and a second thrust bearing located inside of the second piston pocket, the second thrust bearing is located in between the second nut and the second clip;
    wherein during the brake apply, the first nut rotates within the first piston pocket while being axially moved by the first brake piston, and the second nut rotates within the second piston pocket while being axially moved by the second brake piston.

15. A brake system comprising:
    a brake piston;
    a piston pocket defined inside of the brake piston;
    a clip located inside of the piston pocket;
    a nut located inside of the piston pocket; and
    an O-ring surrounding the nut;
    wherein during a first braking application, the brake piston is configured to move the nut,
    wherein during a second braking application, the nut is configured to move the brake piston, and wherein the O-ring is configured to frictionally engage the piston pocket so that the nut is restricted from rotating during the second braking application.

16. The brake system according to claim 15, wherein the piston pocket comprises one or more projections, and
wherein the O-ring is configured to frictionally engages the piston pocket and/or the one or more projections so that the nut is prevented from rotating during the second braking application.

17. The brake system according to claim 16, wherein the frictional engagement of the O-ring against the piston pocket and/or the one or more projections is overcome during the first braking application so that the nut rotates within the piston pocket when the brake piston moves the nut.

18. The brake system according to claim 15, wherein the during the first braking application, the nut is configured to rotate within the piston pocket while the brake piston moves the nut.

19. The brake system according to claim 15, wherein the during the second braking application, the nut is restricted from rotating inside the piston pocket as the brake piston is moved.

* * * * *